UNITED STATES PATENT OFFICE.

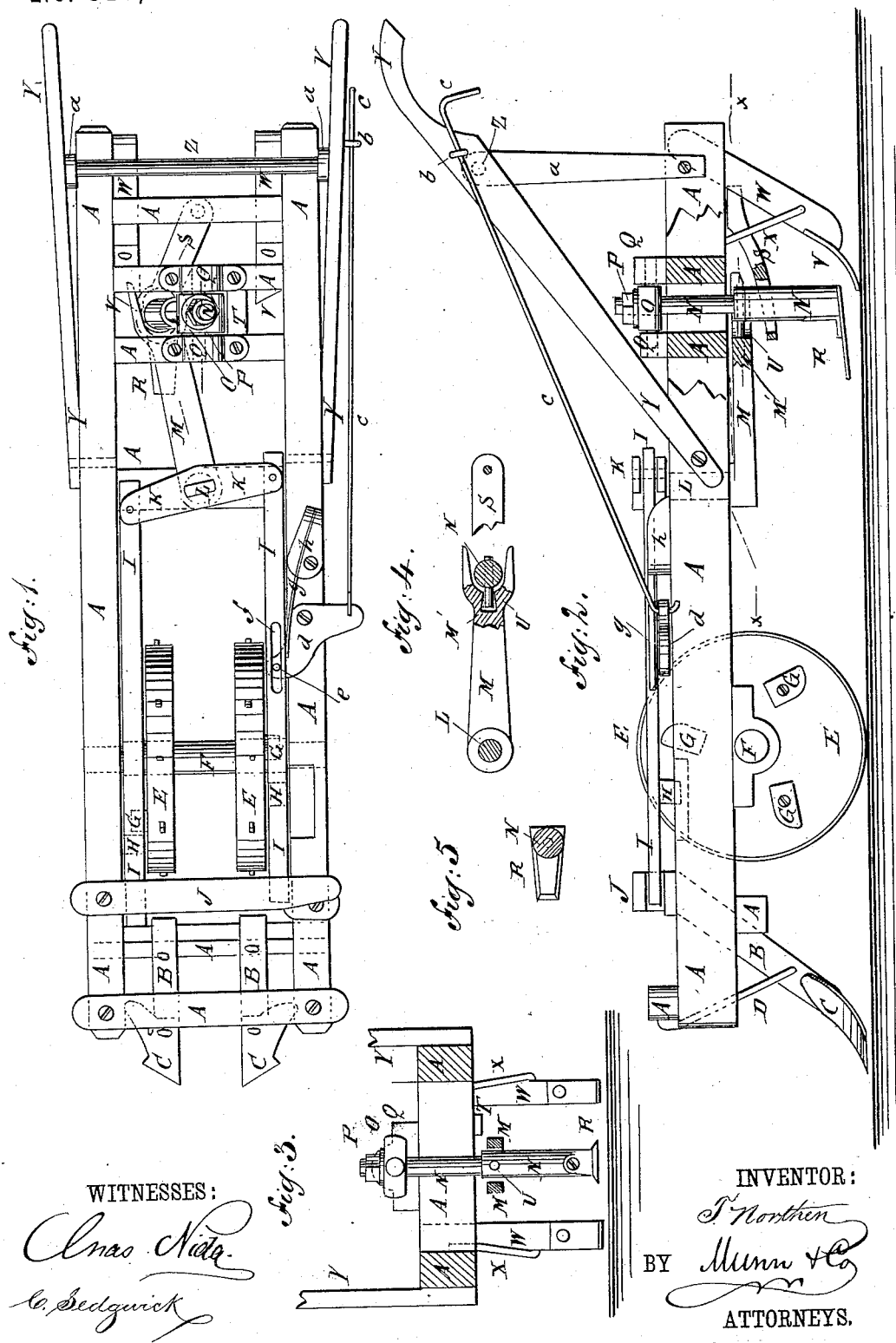

THOMAS NORTHEN, OF LINEVILLE, ALABAMA.

COMBINED SWEEP, COTTON CHOPPER, AND DIRTER.

SPECIFICATION forming part of Letters Patent No. 318,197, dated May 19, 1885.

Application filed January 30, 1885. (No model.)

*To all whom it may concern:*

Be it known that I, THOMAS NORTHEN, of Lineville, in the county of Clay and State of Alabama, have invented a certain new and useful Improvement in a Combined Sweep, Cotton Chopper, and Dirter, of which the following is a full, clear, and exact description.

Reference is to be had to the accompanying drawings, forming a part of this specification, in which similar letters of reference indicate corresponding parts in all the figures.

Figure 1 is a plan view of one of my improved machines. Fig. 2 is a side elevation of the same partly in section. Fig. 3 is a front elevation of the chopper and rear plow-standards, the frame being shown in section. Fig. 4 is a sectional plan view of the chopper and a part of its operating mechanism, taken through the line $x\,x$, Fig. 2, and part being broken away. Fig. 5 is a plan view of the chopping-hoe, the standards being shown in section.

The object of this invention is to provide combined sweeps, cotton choppers, and dirters, simple in construction, inexpensive in manufacture, reliable in operation, and readily controlled.

The invention relates to a combined sweep, cotton chopper, and dirter constructed with a chopper-standard swinging from the frame and connected with two wheels rigidly attached to the same axle, and provided with projections upon their outer sides by two sliding bars having projections upon their lower sides and pivoted at their rear ends to a cross-bar pivoted to the frame and carrying an arm forked to engage with the said chopper-standard. The vibrating forked arm is provided with a recess at the bottom of its fork to receive a pin attached to the swinging chopper-standard, so that the said standard will be rocked as it is vibrated by the said arm. With the handle is connected a sliding rod pivoted to the outer arm of an elbow-lever, the other arm of which is provided with a pin working in a slot in the left-hand sliding bar, which is pressed inward by a spring, so that the chopper can be readily thrown out of gear, and will be held in gear when in use, as will be hereinafter fully described and then claimed.

A is the frame of the machine, to the lower forward cross-bar of which are attached two standards, B, having half-sweeps, turn-plows, or other suitable plows, C, attached to their lower ends. The standards B are strengthened against the resistance of the soil by braces D, attached to their lower parts and to the upper forward cross-bar of the frame A. The standards B are placed at such a distance apart that the plows C will remove stones, clods, trash, and soil from the sides of the row of plants, and leave the plants standing in a narrow ridge of soil, ready to be operated upon by the chopper. Directly in the rear of the plows C, so as to travel in the smooth tracks formed by the said plows C, are placed two wheels, E, the faces of which are provided with spikes or corrugations, or are otherwise roughened to prevent them from slipping upon the ground. The wheels E are rigidly attached to the axle F, so as to always move at the same speed, and the said axle revolves in bearings attached to the side bars of the frame A. To the outer side of each wheel E are attached three (more or less) projections, G, to act as cams against a projection, H, attached to the lower side of the bar I, and carry the said bar forward. The cams G of the two wheels E are so arranged as to operate alternately against the projections H of the two bars I. The forward ends of the bars I slide in guide-slots in the ends of a cross-bar, J, attached to the side bars of the frame A a little in front of the wheels E. The rear ends of the sliding bars I are pivoted to the slotted ends of a cross-bar, K, which is rigidly attached at its center to the upper end of a vertical pivot, L, rocking in a bearing in a cross-bar of the frame A, so that the forward movement of one of the sliding bars I will vibrate the cross-bar K, rock the pivot L, and draw the other sliding bar I back, ready to be moved forward in its turn. To the lower end of the pivot L is rigidly attached a rearwardly-projecting arm, M, which is vibrated by the rocking of the said pivot L. The rear end of the arm M is forked to receive the standard N, the upper part of which passes up through the center of the cross-head O, and has a nut, P, screwed upon its upper end, so that the said standard N can be raised and lowered by adjusting the said nut P. Upon the forward and rear ends of the cross-head O are formed journals which rock in bearings Q, attached to cross-bars of the frame A, so that the standard N will be vibrated by the vibration of the forked arm M. To the lower end of the standard N is attached the rear end of the chopping-hoe R, which is made sharp upon its forward and side edges. The upper part of the standard N passes through an aperture in the forward end of a brace-bar, S, the rear end of which is pivoted to a cross-bar of the frame A.

When the chopper is at work, the standard N rests against the brace-bar S, at the rear end of its aperture, so that the said standard will be strengthened against the resistance of the soil. The aperture in the brace-bar S is elongated at the forward end of the said bar to give the standard N the necessary freedom of movement as it is swung to one side and back.

With this construction the plants are chopped by drawing the chopping-hoe R forward along the row, and the plants are left for a stand by swinging the said hoe to one side. The operating mechanism is so arranged that the hoe R will be swung only to one side, and the movement of the hoe toward the other side is prevented by a bar, T, attached to the cross-bars that carry the chopping-standard cross-head.

To the standard N is attached a pin, U, the projecting forward end of which enters a recess, M', in the end of the arm M, at the bottom of its fork, as shown in Figs. 2 and 4, so that when the said standard N is vibrated by the vibration of the said arm M, the arm M, acting on the pin U, will rock the standard N a little, turning the chopping-hoe R slightly to cause it to enter and leave the soil more readily.

The plants after being chopped to a stand are dirted by the plows V, attached to the lower ends of the standards W, the upper ends of which are secured to the rear ends of the side bars of the frame A. The standards W are strengthened against the resistance of the soil by the braces X, attached at their lower ends to the said standards and at their upper ends to the side bars of the frame A.

With this construction, as the machine is drawn forward, when a projection, G, of the left-hand wheel E strikes the projection H of the left-hand sliding bar I and pushes it forward, the chopping-hoe R is swung into the row of plants and cuts out the plants until a projection, G, of the right-hand wheel E strikes the projection H of the right-hand sliding bar I and pushes it forward, which swings the chopping-hoe R out of the row of plants and leaves plants for a hill. The relative lengths of the spaces cut out and the spaces left for hills are regulated by the relative positions of the projections G upon the wheels E, and the absolute lengths of the spaces cut out and of the spaces left for hills are regulated by the size of the wheels E and the number of projections G attached to each wheel.

To the middle parts of the side bars of the frame A are attached the forward ends of the handles Y, which are held in proper relative positions by the round Z, attached at its ends to the rear parts of the said handles. The rear ends of the handles Y are supported at a proper height by the uprights a, the lower ends of which are attached to the rear ends of the side bars of the frame A, and their upper ends are attached to the rear parts of the handles Y or to the round Z. To the outer side of the upper part of the left-hand handle Y is attached a guide-keeper, b, in which slides the rear part of a rod, c. The rear end of the rod c serves as a handle, and its forward end is pivoted to the outer arm of an elbow-lever, d, which is pivoted at its angle to the side bar of the frame A. The inner arm of the elbow-lever d projects beneath the left-hand sliding bar I, and has an upwardly-projecting pin, e, attached to it, which projects through a longitudinal slot, f, in the said bar I.

With this construction, by drawing the rod c to the rearward the elbow-lever d will be operated to swing the forward end of the sliding bar I outward, so that the projections G of the wheel E will not engage with the projection H of the said sliding bar I, and the right-hand sliding bar I will be left in its forward position, and the chopping-hoe will be left swung to one side and away from the row of plants, so that the machine can be drawn forward without operating the chopper. The left-hand sliding bar I is held inward in a working position by a spring, g, which rests against its outer side, and which is secured to a holding-block, h, attached to the side bar of the frame A.

Having thus fully described my invention, I claim as new and desire to secure by Letters Patent—

1. In a combined sweep, cotton chopper, and dirter, the combination, with the frame A and the swinging chopper-standard N, of the two wheels E, rigidly connected with the same axle and provided with projections G, the sliding bars I, provided with projections H, and the pivoted cross-bar K, connected with the two sliding bars and carrying a forked arm, M, to engage with the said chopping-standard, substantially as herein shown and described, whereby the said chopping-standard will be vibrated by the advance of the machine, as set forth.

2. In a combined sweep, cotton chopper, and dirter, the combination, with the frame A and the swinging chopper-standard N, of the pivoted brace-bar S, substantially as herein shown and described, whereby the said standard is strengthened against rearward pressure, as set forth.

3. In a combined sweep, cotton chopper, and dirter, the combination, with the vibrating forked arm M, having a recess, M', at the bottom of its fork, and the swinging chopper-standard N, of the pin U, substantially as herein shown and described, whereby the said standard will be rocked as it is vibrated by the said arm, as set forth.

4. In a combined sweep, cotton chopper, and dirter, the combination, with the handle Y, the frame A, and the sliding bar I, having slot $f$, of the sliding rod $c$, the elbow-lever $d$, and the spring $g$, substantially as herein shown and described, whereby the chopper can be readily thrown out of gear, and will be held in gear when in use, as set forth.

THOS. NORTHEN.

Witnesses:
ALEX. BECK,
R. R. PARKER.